United States Patent [19]
Scanlon

[11] 4,254,967
[45] Mar. 10, 1981

[54] REMOVABLE KING PIN
[76] Inventor: Ray M. Scanlon, 429 Rosedon Dr., Montgomery, Ala. 36116
[21] Appl. No.: 82,196
[22] Filed: Oct. 5, 1979
[51] Int. Cl.³ ............................................. B62D 53/08
[52] U.S. Cl. ................................................... 280/433
[58] Field of Search ................... 280/433, 407, 415 A; 403/338, 335, 370

[56] References Cited
U.S. PATENT DOCUMENTS

| 2,838,324 | 6/1958 | Dalton | 280/407 |
| 3,362,731 | 1/1968 | Gasche | 403/370 X |
| 3,600,005 | 8/1971 | Glaza | 280/433 |
| 3,807,765 | 4/1974 | Pokornicki | 280/433 |
| 3,807,766 | 4/1974 | Pleier | 280/433 |
| 3,811,708 | 5/1974 | Basso | 280/433 |

Primary Examiner—John A. Pekar
Attorney, Agent, or Firm—Robert M. Leonardi; Norb A. Heban

[57] ABSTRACT

A king pin assembly is disclosed having threadedly connected housings for supporting a removable king pin. Each housing has guide for engaging portions of the king pin to rigidly retain it in place. Positioning means formed on the king pin and one of the housings cooperate to centrally locate and prevent king pin rotation when the parts are assembled.

10 Claims, 4 Drawing Figures

REMOVABLE KING PIN

BACKGROUND OF THE INVENTION

The present invention relates to tractor-trailer fifth wheel coupling devices in general and is particularly directed to a removable king pin support assembly for these devices.

Tractor-trailer operators are required to use fifth wheel king pins manufactured to meet industry standards. Recommended practice is to utilize one size king pin for conventional commercial applications and another size for heavy duty off-highway operation or in hauling heavy loads. Because of this, manufacturers offer trailer king pin support assemblies which will accommodate either size king pin. Also, because the exposed end of the king pin is subject to wear or damage as a result of constant coupling and uncoupling, it is most advantageous to vehicle owners and operators to have a king pin which can be easily and quickly replaced. Interchangeability of equipment therefore is of major concern and importance to a vehicle operator or fleet owner.

Known devices have achieved the desired result by providing a king pin support in the form of separable housings which cooperate to rigidly secure the king pin to the underside of the trailer. While stability and ease of removal are prime factors to be considered in fifth wheel applications, it is also essential that the king pin be properly located and rigidly held so that it does not rotate relative to the supporting parts. Improper location or looseness in the assembly will contribute to early failure and, accordingly, short life of the assembly.

Removable king pin supports fall into two basic categories, those in which the separable parts permit the king pin to be inserted and removed from within the trailer and those permitting insertion and removal from the trailer underside. The latter type has proven to be most acceptable for a number of reasons, the most obvious being that the former type, when encountering a loaded trailer, requires partial or full unloading for access to the king pin assembly.

Proper location and stability is achieved in known devices by employing cooperating tapered surfaces on mating separable housings to provide a tight wedging action. This permits the king pin to be self-centered and thereby securely retains and locates the king pin in assembled relation. Ordinarily, two or more housing members are provided with mating tapered surfaces and, when assembled, provide a tight frictional connection between the members. In certain instances, in addition to the housing members, the king pin itself is formed with a tapered surface. A disadvantage in structures of this type is that special machining is required to insure that the tapered surfaces always come in tight, solid engagement when assembled. A further disadvantage is that it is difficult to break such a connection. The desirable self-centering feature created by the tapered configuration is outweighed by the difficulty encountered in breaking the tight fit and by the machining costs.

King pins may be designed for removal in a number of ways. For example, one common design includes a socket in the king pin bottom for receiving a conventional socket wrench and a threaded king pin upper end adapted to be connected to one of the separable housings. In this design the threaded king pin portion is an actual load carrying member in the assembly and, due to the severe impact loads it is subjected to, is readily susceptible to damage and early failure.

Means are also provided in known devices to prevent king pin rotation when in service. Some require considerable modification to the king pin itself and to at least one of the housing members in order to function properly. Others require separate spring loaded locking members for engaging slots formed in the king pin. In the latter case, a separate locking member is required and further an additional operation is necessary to retract it when the king pin is being removed.

While the above devices operate in a satisfactory manner, because each requires considerable structural modifications to be made to the king pin and at least one of the support members and/or the addition of another operating member to effect the locking action, they are costly and structurally complex.

SUMMARY OF THE INVENTION

The present invention is a king pin mounting unit comprising opposed threadedly connected housing members which cooperate to removably retain the king pin in assembled relation. The housing members and king pin have integral guide means defined by straight horizontally and vertically extending mating surfaces. Integral positioning means on one of the housing members and the king pin cooperate to center the king pin and prevent it from rotating when assembled.

DESCRIPTION OF THE PREFERRED EMBODIMENT

Figure 1:
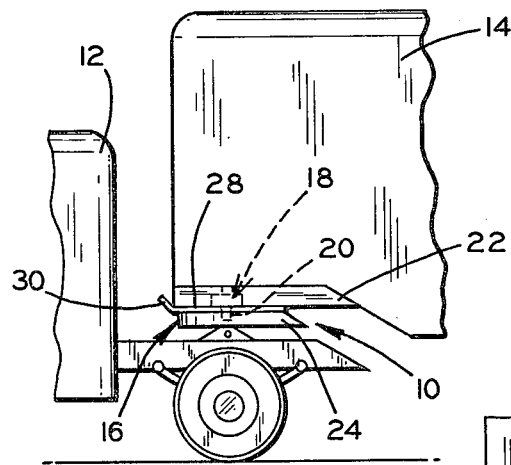
FIG. 1 is a partial diagrammatic view illustrating a tractor rear end and trailer front end coupled together by means of a fifth wheel king pin assembly.

Referring to FIG. 1 of the drawings, a coupling device is shown schematically at 10 for releasably and articulatively connecting a tractor 12 to a trailer 14. The coupling device comprises a conventional fifth wheel assembly 16 located on the tractor back end and a king pin assembly 18 located on the trailer front end. The king pin assembly 18 includes a king pin 20 which projects downwardly in a vertical direction from the underside of the trailer floor 22. The tractor fifth wheel assembly 16 includes the usual rocking plate 24 having a slot (not shown) to receive and lock the king pin 20 in place, thereby connecting the tractor 12 and trailer 14 in the intended manner.

Figure 2:
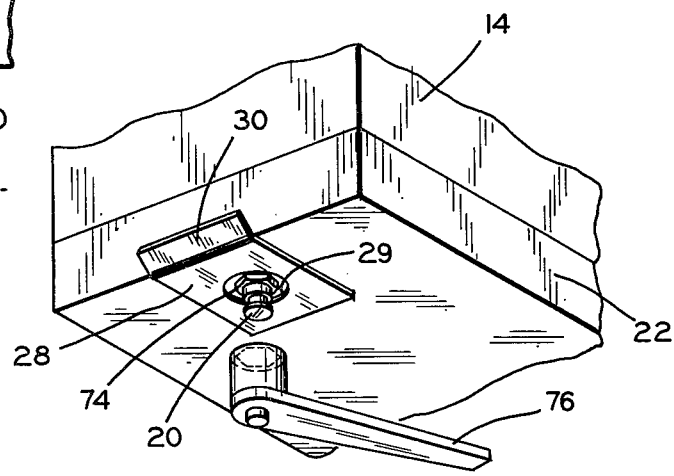
FIG. 2 is a partial perspective view from the underside of the trailer front end showing the external appearance of the king pin assembly of the present invention.

In a preferred embodiment, king pin assembly 18 is shown secured between structural channel members 26 and upper plate 27 of trailer floor 22 in any well-known manner, e.g. welding. A skid plate 28 is secured to the trailer underside. As seen in FIG. 2, skid plate 28 has an opening 29 through which king pin 20 projects and an upwardly curved forward end 30 for sliding engagement with the angled surface on the fifth wheel rocking plate 24 to aide in the coupling operation.

Figure 3:
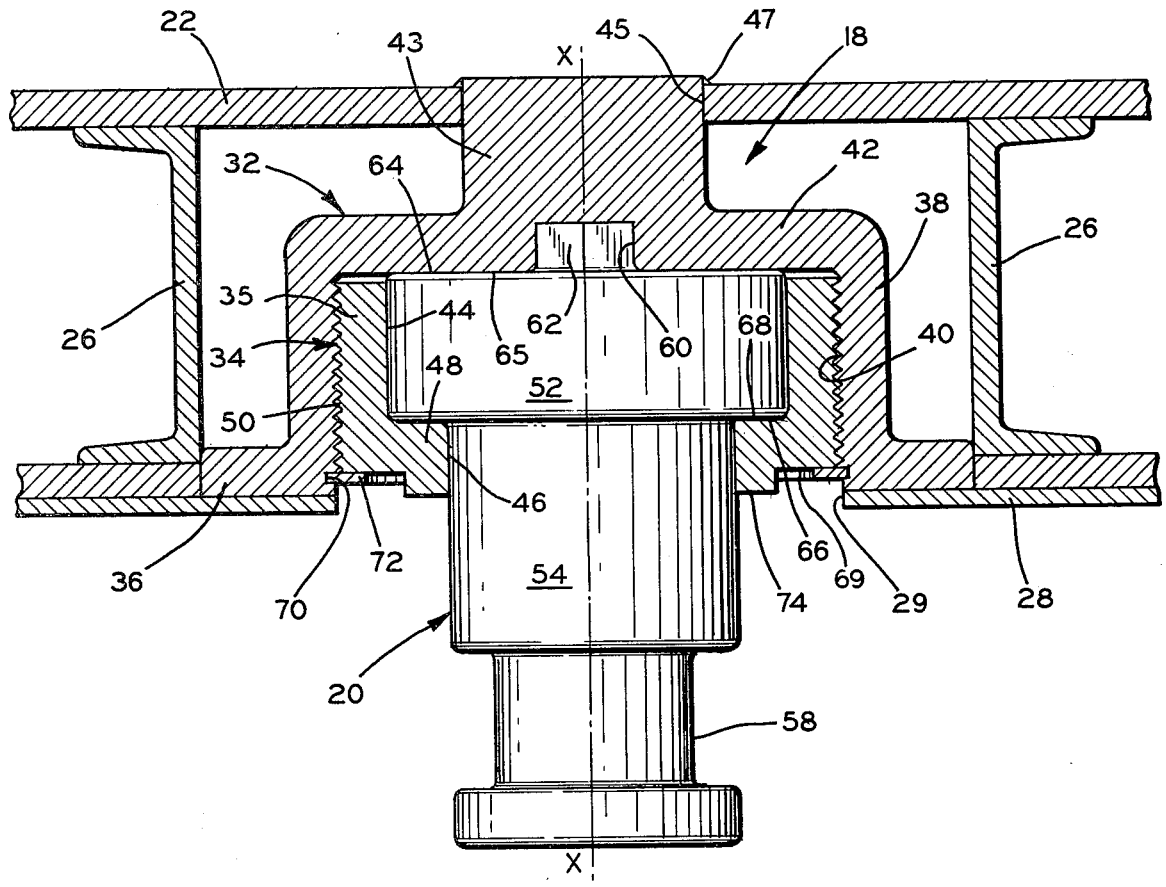
FIG. 3 is a side elevational view, partly in section, of the king pin assembly of the present invention connected to the trailer underside.
Figure 4:
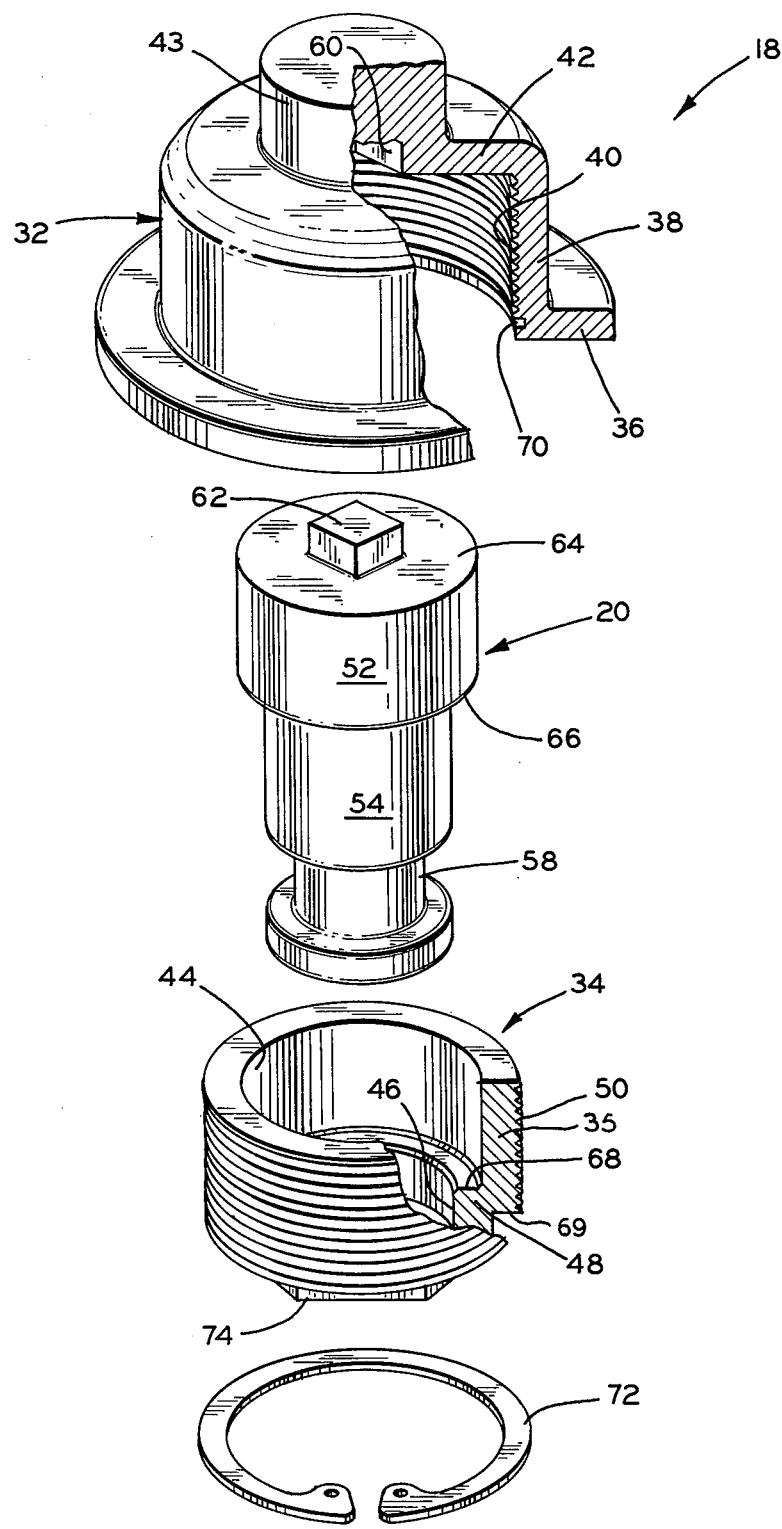
FIG. 4 is an exploded perspective view showing the components of the king pin assembly of the present invention.

The present invention is shown in more detail in FIG. 3 wherein the king pin assembly 18, in addition to king pin 20, further includes a two-part housing for removably supporting the king pin 20 on the underside of trailer 14. The two-part housing comprises an outer stationary support housing 32 fixed to the trailer frame 22 and an inner retainer housing 34 adapted to be removably connected to the support housing 32.

Support housing 32 comprises a cylindrical body 38 containing a central threaded opening 40 which is open at its bottom end and closed at its upper end by a horizontally extending end wall 42. A cylindrical projection 43 extends upwardly from the top surface of end wall 42 and passes through an opening 45 in plate 27. Projection 43 in the preferred embodiment, extends slightly above the upper surface of plate 27 and a weld 47 is provided to secure the parts in place. Surrounding the open bottom end is a radially outwardly extending annular flange 36 adapted to be positioned between and secured to spaced channel members 26.

Retainer housing 34 comprises a cylindrical body 35 having an externally threaded surface 50 for removable engagement with support housing threaded opening 40 of support housing 32. The mating threaded surfaces define means for removably connecting the housings so that king pin 20 is properly mounted and held in assembled relation. A stepped centrally located through passage is formed in retainer housing 34 defined by an upper enlarged diameter opening 44 and a lower reduced diameter opening 46. The opening 46 extends through and is located in a radial flange 48 at the bottom of retainer housing 34. Flange 48 projects inwardly toward the king pin axis X-X and has spaced top and bottom wall 68 and 69 respectively, the use of which will later be described in more detail.

King pin 20 is removably supported in support housing 32 by retainer housing 34 and also prevented from rotating relative to the supporting parts when the members are properly secured together. In the preferred embodiment, king pin 20 is provided with stepped diameter portions including a first cylindrical upper portion 52 having a first diameter adapted for reception in upper retainer housing opening 44 and a second diameter lower portion 54 having a diameter less than that of upper portion 52 adapted to mate and pass through lower retainer housing opening 46. Opening 44 has an inner peripheral surface corresponding substantially in diameter to the outer peripheral surface of king pin upper portion 52 while opening 46 has an inner peripheral surface which corresponds substantially in diameter to the outer peripheral surface of king pin lower portion 54. The peripheral surfaces thus engage and constitute a first set of mating guide walls on the king pin 20 and retainer housing 34 which extend in a direction parallel to king pin axis X-X. A reduced diameter annular groove 58 is constructed adjacent the bottom end of lower portion 54 for engaging the slotted portion of the tractor mounted fifth wheel plate 24.

The construction of king pin 20 is such that the cylindrical outer peripheral surface of upper diameter portion 52 is bounded by longitudinally spaced top horizontally extending wall 64 and a bottom wall formed by an inwardly extending shoulder 66. Top wall 64 provides a complementary guide surface for flush engagement with the bottom surface 65 of support housing end wall 42. The bottom surface of shoulder 66 provides a complementary guide wall for flush engagement with the top retainer housing flange surface 68. A second set of mating guide walls are thus provided on king pin 20 and retainer housing 34 by the bottom surface of king pin shoulder 66 and top surface 68 of retainer housing flange 48. These surfaces extend in a direction perpendicular to king pin axis X-X.

Upper king portion 52 and support housing 32 have third set of mating guide walls formed by engagement of top king pin surface 64 and bottom surface 65 of support housing end wall 42. These surfaces extend in a direction perpendicular to king pin axis X-X. Thus, the various guide walls constructed on the support housing 32 and retainer housing 34 cooperate to present a cylindrical enclosure in which upper king pin portion 52 is retained.

By constructing opening 46 and lower king pin portion 54 of substantially equal diameters, the peripheral surfaces mate to provide a fourth set of guide walls extending in a direction parallel to king pin axis X-X.

Because of the severe impact loads introduced on the king pin during the coupling operation, i.e., when the tractor fifth wheel is moved into locking engagement with the king pin, it is essential that the king pin be properly located and rigidly held in a non-rotating central position when the parts are in their assembled condition. In addition, king pin life can be greatly increased if the king pin will not be a load carrying member in the assembly.

In the preferred embodiment, the above is achieved by positioning means on the king pin 20 and on the support housing 32. The positioning means are integrally formed on each member and cooperate to centrally locate the king pin 20 within the housings and to prevent relative rotation. Relative rotation is prevented by a square opening 60 in support housing end wall 42 and a cooperating integral square head 62 projecting upwardly from the top surface 64 of king pin upper portion 52. Support housing opening 60 and king pin head 62 are centrally positioned along king pin axis X-X, thereby also serving to centrally locate the king pin 20 relative to support housing 32. It will be evident that opening 60 and head 62 need not be square in configuration but may be constructed in any non-circular shape, e.g., oval, diamond, rectangular, etc. sufficient to prevent relative movement between the parts.

To complete the assembly, releasable locking means are provided for retaining retainer housing 34 in support housing 32. The lower end of support housing opening 40 contains an annular groove 70 for receiving an annular split snap ring 72. Snap ring 72 is locked in groove 70 after retainer housing 34 has been threaded into support housing 32 and engages bottom surface 69 of flange 48 to prevent backing off of retainer housing 34 due to vibration. Because of its location, snap ring 72 permits easy and quick removal of king pin 20 from the underside of the trailer 14 in the event the king pin becomes worn or damaged or an operator is required to change from one size king pin to another, e.g., from a conventional to a heavy duty.

To threadedly fasten and remove the retainer housing 34 from within support housing 32, the bottom side of connecting wall 48 is machined in a hexagon configuration thereby providing a nut 74 for engagement by a conventional hex head socket wrench 76 (shown in in FIG. 2). This arrangement permits an operator to easily and quickly remove king pin 20 from the underside of trailer 14 in the event the king pin is damaged or it is necessary to change from one size to another. Briefly, rotation is imparted to retainer housing 34 by wrench 76 and therefore from the top of retainer housing wall 68 to the underside of king pin upper portion wall 66 until the king pin 20 is firmly seated so that upper wall 64 is flush with end wall 65. In this position, king pin head 62 is firmly seated in support housing opening 60 the snap ring 72 is then inserted in groove 70 to complete the assembly.

From the foregoing description, it is apparent that the advantages of the present invention result from the various mating walls which have surfaces extending in direction either parallel or perpendicular to the king pin axis X-X. This relationship eliminates any possibility of a wedging action between the king pin and housings that would make it difficult to change king pin sizes. In addition, the surface construction and the threaded mounting connection of the present invention eliminates the need for maintaining close tolerances required in previous designs employing tapered wedge surfaces.

As constructed, the support housing 32, retainer housing 34 and snap ring 72 are universal for all king pin assemblies. The king may be varied in length according to the trailer mounting plate requirements.

Having thus described a preferred embodiment of the present invention, it should be understood that the invention is not to be limited to the specific construction and arrangement described. It will be apparent to those skilled in the art that modifications or alterations may be made without departing from the spirit and scope of the invention as set forth in the appended claims.

It is obvious from the foregoing disclosure that the described structure provides a king pin assembly which will permit quick and easy removal of a king pin when it is worn or damaged or when different size king pins are required. The present invention has achieved the desired results in a simpler and more economical manner than previously possible.

What is claimed is:

1. In a coupling device for removably supporting a king pin having a longitudinal axis, a support housing, a retainer housing adapted to be supported in said support housing, said retainer housing having a guide opening for receiving said king pin, and means removably connecting said retainer housing to said support housing for holding said king pin in said support housing; the improvement comprising;
 means for guiding said king pin in said retainer housing opening, said guide means including
 a first set of mating guide walls on said king pin and said retainer housing extending in a direction parallel to said king pin axis, and
 a second set of mating guide walls on said king pin and said retainer housing extending in a direction perpendicular to said king pin axis,
 means for positioning said king pin with respect to said support housing, said positioning means including a non-circular projection on said king pin, and
 a non-circular opening in said support housing for receiving said non-circular projection to prevent relative rotation between said king pin and said support housing.

2. A coupling device according to claim 1 wherein said king pin has a first cylindrical portion having a first diameter and a second cylindrical portion having a diameter less than said first diameter, said retainer housing having a first annular guide opening for receiving said first cylindrical king pin portion defining said first set of mating guide walls and a second annular guide opening for receiving said second cylindrical king pin portion defining said second set of mating guide walls.

3. A coupling device according to claim 2 wherein a radially inwardly directed flange extends between said first and second cylindrical retainer housing guide openings, said retainer housing radial flange defining spaced top and bottom surfaces, said first cylindrical retainer housing opening defining a peripheral surface, said first annular king pin portion defining a peripheral surface and spaced top and bottom surfaces, said peripheral retainer housing surface engaging said peripheral first king pin portion and constituting said first set of mating guide walls, said retainer housing radial flange top surface engaging said first annular king pin bottom surface and constituting said second set of mating guide walls.

4. A coupling device according to claim 3 wherein said removable connecting means includes a threaded opening in said support housing and a threaded portion on said retainer housing for engagement with said threaded support housing opening.

5. A coupling device according to claim 4 wherein said threaded support housing opening has a closed end, said coupling device further comprising means for releasably locking said retainer housing in said support housing, said locking means including a groove in said support housing threaded opening and a removable ring disposed in said groove and engaging said retainer housing radial flange bottom surface.

6. A coupling device according to claim 5 wherein said guide means further includes a third set of guide walls on said king pin and said support housing extending in a direction perpendicular to said king pin axis.

7. A coupling device according to claim 6 wherein said support housing closed end wall defines a bottom surface, said end wall bottom surface engaging said first annular king pin top surface and constituting said third set of mating guide walls.

8. A coupling device according to claim 7 wherein said second cylindrical retainer housing guide opening and said second cylindrical king pin portion have mating peripheral surfaces defining a fourth set of guide walls extending in a direction parallel to said king pin axis.

9. A coupling device according to claim 5 wherein said non-circular king pin projection is integral with said first annular king pin portion, and said non-circular opening is integral with said support housing closed end wall.

10. A coupling device according to claim 9 wherein said non-circular projection and said non-circular opening are square.

* * * * *